(12) United States Patent
Coulon et al.

(10) Patent No.: US 9,256,432 B2
(45) Date of Patent: Feb. 9, 2016

(54) METHOD OF COMPRESSING AND DECOMPRESSING AN EXECUTABLE OR INTERPRETABLE PROGRAM

(75) Inventors: Jean-Roch Coulon, Le Tholonet (FR); Jorge Perez, Aix en Provence (FR); Sylvere Teissier, Violes (FR)

(73) Assignee: INVIA, Meyreuil (FR)

( * ) Notice: Subject to any disclaimer, the term of this patent is extended or adjusted under 35 U.S.C. 154(b) by 293 days.

(21) Appl. No.: 13/701,765

(22) PCT Filed: Jun. 3, 2011

(86) PCT No.: PCT/FR2011/000328
§ 371 (c)(1),
(2), (4) Date: Feb. 5, 2013

(87) PCT Pub. No.: WO2011/151545
PCT Pub. Date: Dec. 8, 2011

(65) Prior Publication Data
US 2013/0132710 A1    May 23, 2013

(30) Foreign Application Priority Data
Jun. 3, 2010 (FR) ...................................... 10 02361

(51) Int. Cl.
*G06F 9/445* (2006.01)
*G06F 9/45* (2006.01)
*G06F 9/30* (2006.01)
*G06F 9/44* (2006.01)

(52) U.S. Cl.
CPC ............ *G06F 9/30181* (2013.01); *G06F 9/445* (2013.01); *G06F 8/52* (2013.01)

(58) Field of Classification Search
CPC ............ G06F 8/52; G06F 8/54; G06F 9/445; G06F 9/30181

USPC .......................................... 717/139, 155, 162
See application file for complete search history.

(56) References Cited

U.S. PATENT DOCUMENTS 6,416,410 B1 * 7/2002 Abou-Samra et al. .......... 463/31
7,185,330 B1    2/2007 Khu
(Continued)

FOREIGN PATENT DOCUMENTS

WO    01/41312 A1    6/2001

OTHER PUBLICATIONS

International Search Report of PCT/FR2011/000328, mailing date of Aug. 26, 2011.

*Primary Examiner* — Ryan Coyer
(74) *Attorney, Agent, or Firm* — Westerman, Hattori, Daniels & Adrian, LLP

(57) ABSTRACT

The method of compressing and decompressing an executable program, can be executed by a microprocessor or interpreted by an interpreter of an integrated circuit device: instructions are reformatted into the format of an initial set of instructions of said program for obtaining instructions in the format of an intermediate set of instructions; repetition templates in the program are determined and, for each repetition template, a pair is defined, formed of said repetition template and of an instruction in the format of a set of instructions; intermediate instructions are replaced by compressed instructions and the links of the compressed program are modified; the compressed program is stored in a memory of the device; and the compressed program is decompressed and the initial instructions are executed by said microprocessor or interpreted by said interpreter. The invention applies, in particular, to the integrated circuits of embedded devices.

20 Claims, 7 Drawing Sheets

(56) References Cited

U.S. PATENT DOCUMENTS

2004/0243985 A1* 12/2004 Le Metayer et al. .......... 717/139
2005/0268293 A1 12/2005 Kawahito et al.
2006/0206886 A1* 9/2006 Wu et al. ....................... 717/151
2007/0079296 A1* 4/2007 Li et al. ......................... 717/136

* cited by examiner

```
@                          instruction

0x0     MOV 1, R0          00 00001 010
0x4     B +6               01 00000110            3.1
0x8     MOV -1, R0         00 11111 010
0xC     B +4               01 00000100
0x10    MOV 1, R0          00 00001 010
0x14    B +2               01 00000010
0x18    NOP                10 00000000
0x1C    MOV -2, R1         10 11110 101

```
              @
              0x0   MOV 1, R0
              0x2   B label
              0x4   MOV -1, R0
  4.1         0x6   B label
              0x8   MOV 1, R0
              0xA   B label
              0xC   NOP
      Label : 0xE   MOV -2, R1

@                       CRC
              0x0   MOV 1, R0         CRC(MOV 1, R0)
              0x2   B label           CRC(B label)
              0x4   MOV -1, R0        CRC(MOV -1, R0)
  4.2         0x6   B label           CRC(B label)
              0x8   MOV 1, R0         CRC(MOV 1, R0)
              0xA   B label           CRC(B label)
              0xC   NOP               CRC(NOP)
      Label : 0xE   MOV -2, R1        CRC(MOV -2, R1)

@                       CRC
              0x0   MOV 1, R0
              0x2   B label           CRC(MOV 1, R0; B label)
              0x5   MOV -1, R0
  4.3         0x7   B label           CRC(MOV -1, R0; B label)
              0xA   MOV 1, R0
              0xC   B label           CRC(MOV 1, R0; B label)
              0xF   NOP               CRC(NOP)
      Label : 0x12  MOV -2, R1        CRC(0x12)
```

Figure 4

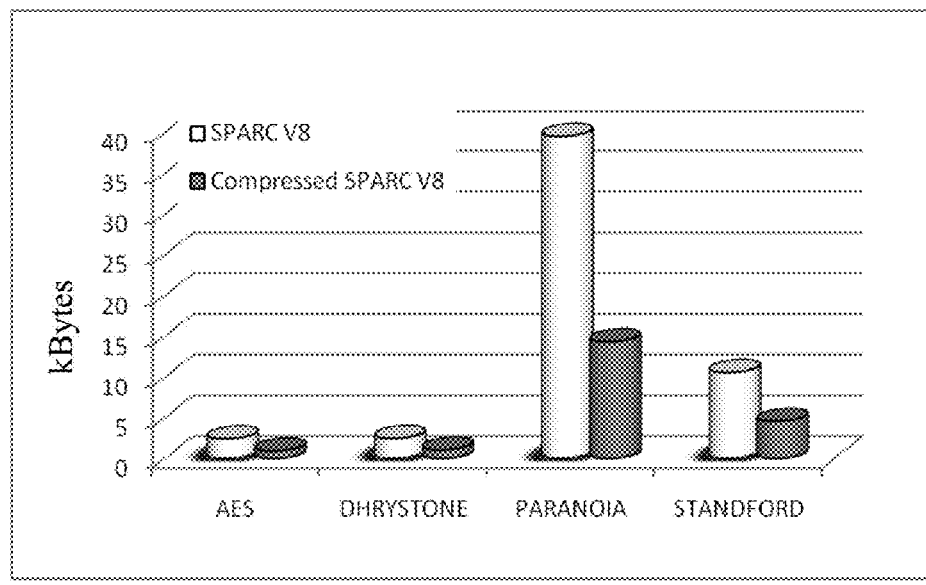
Figure 7.1
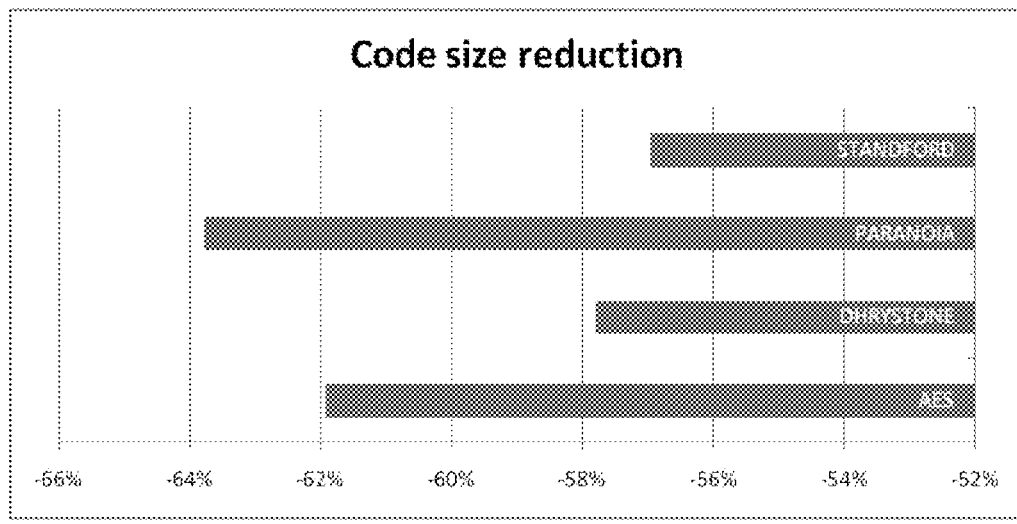
Figure 7.2

METHOD OF COMPRESSING AND DECOMPRESSING AN EXECUTABLE OR INTERPRETABLE PROGRAM

FIELD OF THE INVENTION

The history of microprocessors is marked by a limited number of instruction sets. These instruction sets have specific performances and some are used by mass-produced products. The latter have become traditional instruction sets and the applications developed with these instruction sets are essentially non-embedded on a single integrated circuit (IC). The programs executed with the traditional instruction sets occupy more memory space by comparison with programs executed with the instruction sets developed specifically for applications embedded on a single IC or a plurality of ICs.

These programs intended for applications embedded on a single IC or a plurality of ICs may use the traditional instruction sets and thus benefit from their assets.

This invention relates to a compression and decompression method and a device for decompressing a program consisting of instructions interpretable by an interpreter or executable by a microprocessor. The method or the device of this invention applies to any type of instruction sets.

PRIOR ART

Microprocessor manufacturers propose a series of tools intended to run the application encoded in a high-level language, such as C language, on the instruction sets proposed for the microprocessors. For the same technology, the surface of the IC is directly linked to the size of the memory of the IC in which all of the instructions of the application are stored. The IC of a smart card produced, for example, with 130-nm technology with a flash memory point of 0.18 µm2, has 70% of its surface occupied by 350 kOctets of the memory.

Users of microprocessors want to distribute secure products. To protect against theft of the intellectual property contained in the program stored in the memory, the products must be protected against reverse engineering of these products once distributed in the field and against pirating of the program when the programming of the memory is delocalized. In addition, to counter attempts to trap the program in order to extract data detrimental to the operators of the embedded application, the products must be protected from these trapping attempts, detect them and provide notifications of them.

Thus, the user of microprocessors intended for embedded applications selects the microprocessor and its series of tools so that:

the applications run easily, the memory space is minimal, the instruction set is powerful, i.e. it minimizes the energy consumption of the device and the program is executed quickly, the device is protected against attacks.

As previously indicated, the surfaces occupied by the memory in the ICs of the UICC cards that embed in particular the subscriber identification application (SIM, subscriber identification module) may represent 60% to 80% of the surface of the IC of said UICC cards. Thus, in consideration of volumes, several billion SIM cards manufactured in 2009, it is essential to reduce the surface devoted to memory. The developers of embedded devices want a small memory surface and reduced consumption. These criteria determine the instruction set.

The instruction sets of certain microprocessors enable dense programs by construction. This is the case, in particular, of the instruction sets of the families of 32-bit Motorola™ 68K and Intel™ x86 processors. The compression of programs for such processors according to the invention is therefore of little interest. By contrast, the instruction sets of other more recent microprocessors intended to serve more specific applications produce low-density programs. This is the case, in particular, of 32-bit microprocessors with reduced instruction sets RISC (reduced instruction set computer). The compression and decompression method applied to the programs of these processors according to the invention is then of great interest.

The document entitled "Compact Programme Generation through Custom Instruction Sets", unclassified version of TN 417/96, Maarten Wegdam revisited by Rik van de Wiel, unclassified report 822/98, date of issue September 1998, Philips Electronics™ 1998, discloses a method of compression with definition of a new optimized instruction set for minimizing the size of the resulting program. This optimization is performed at the level of the compilation on the basis of learning with respect to the C program to be compiled. When this method is applied to the instruction set of an RISC processor (MIPS), the size of the resulting program is equal to ⅓ of the size of the original program. Nevertheless, the execution of the instructions of the compression instruction set is considerably slower than those of the initial instruction set. Indeed, the decompression time is detrimental to the execution time of the application.

Other methods proposed according to the prior art are based on the block loading of a compressed program in a buffer space with a subsequent decompression These methods require additional hardware and time resources. Therefore, these methods are not suitable for embedded devices.

Also according to the prior art, in RISC 32-bit ARM™ or MIPS processors, new instructions are encoded on 16 bits. Using the 16-bit instructions and the 32-bit instructions, instead of only instructions encoded on 32 bits, the memory space was reduced by 20 to 30%. However, this method is based on the definition of a new propriety instruction set that: reduces the number of registries, limits the range of accessible addresses, limits the size of the fields in the 16-bit instructions, and the new 16-bit instructions do not have the functional possibilities of the 32-bit instructions.

Finally, the document entitled "Revisiting Java Byteprogramme Compression for Embedded and Mobile Computing Environments", Dimitris Saougkos et al., IEEE Transactions on Software Engineering, Vol. 33, No. 7, July 2007, describes in detail a compression method based on the identification of similar instruction sequences in a program. According to this method, the compressed instructions are encoded in the unused opcodes of the initial instruction set. The method of determining repetition patterns cannot be done in practical terms. Moreover, the space available for programming the new opcodes is not sufficient for creating a significant number of repetition patterns.

SUMMARY OF THE INVENTION

This invention solves the problems of density and security of a program by defining a compression and decompression method and a device for decompressing this program consisting of instructions of an instruction set and interpretable by an interpreter or executable by a microprocessor. The method and the device of this invention apply to any type of instruction set.

The invention relates to a method for compressing and decompressing an initial program executable by a microprocessor or interpretable by an interpreter of an integrated circuit device, comprising the following steps of:

a) reformatting initial instructions of said program to obtain intermediate instructions by function f;

b) determining repetition and definition patterns, for each repetition pattern, of a pair formed from said repetition pattern and an instruction compressed by function h;

c) replacing the intermediate instructions with compressed instructions and modifying the program links to obtain a program compressed by function g;

d) replacing the compressed instructions with the intermediate instructions by function $g^{-1}$ to obtain the intermediate program; and e) reformatting the intermediate instructions by function $f^{-1}$ to obtain the initial program;

and an integrated circuit device capable of executing a program executable by a microprocessor of said device or of interpreting such a program interpretable by an interpreter of said device, including a program compressed according to the method.

Advantageously,—in step a) to increase the similarity in the intermediate program, the relative addressing is transformed into absolute addressing and/or specific fields are classified and/or certain fields are inverted;—the repetition patterns, in step b), are determined by applying the following method: step 1: assigning values to parameters m, q and c; step 2: optionally, for all of the macros in a group of macros, calculating the probability of the value by bit; step 3: optionally, fixing, at 0 or 1, the bits of which the probability is closest to 0 or 1, respectively; step 4: extracting, from the group of macros, all of the macros not satisfying the previous decision; step 5: returning to step 2 unless the necessary number of fixed positions has been reached; step 6: if n is the number of macros associated with the repetition pattern, the number n×(m−c) of bits may be economized, and the repetition pattern is added to the list of repetition patterns;—the program compressed in step c) is encrypted then decrypted before step d;—the encrypted program is decrypted on the fly;—the compressed program is decompressed on the fly and the initial instructions are executed;—the reformatting of the instructions defines new fields intended for jump data and/or new opcodes and/or redundancy to ensure the integrity of the instructions and/or of the data intended for protection against trapping of the program;—a new field contains the signature of the instructions and/or the addresses of the instructions and/or the address accessed in the event of a jump;—additional data is inserted between two compressed instructions;—the decompression algorithm, functions $g^{-1}$ and/or $f^{-1}$, is synthesized in hardware on one of the integrated circuits;—the device is connected to the exterior world by at least one of the following communication channels: single wire protocol NFC (ISO14443), USB or ISO/IEC7816-3 and controlled by a microprocessor that executes, on the fly, the initial program instructions stored and compressed in the memory of one of the integrated circuits;—the set of compressed instructions of said program are stored in the nonvolatile memory of one of the integrated circuits;—the microprocessor is an RISC microprocessor.

BRIEF DESCRIPTION OF THE FIGURES

The invention will be easier to understand in view of the following non-limiting description, with reference to the appended figures, wherein:

FIG. 3 shows the step of reorganizing the instruction bit fields in order to increase the similarity in the program;

FIG. 4 shows two examples of bit fields useful to add to the instruction in order to control the integrity of the instructions and/or the program trapping;

FIGS. 7.1 and 7.2 compare the sizes of different programs executed by the SPARC-V8™ microprocessor if said programs are not compressed and if said programs are compressed, i.e. formatted as the compression instruction set according to the invention.

DETAILED DESCRIPTION OF THE INVENTION

Figure 1:
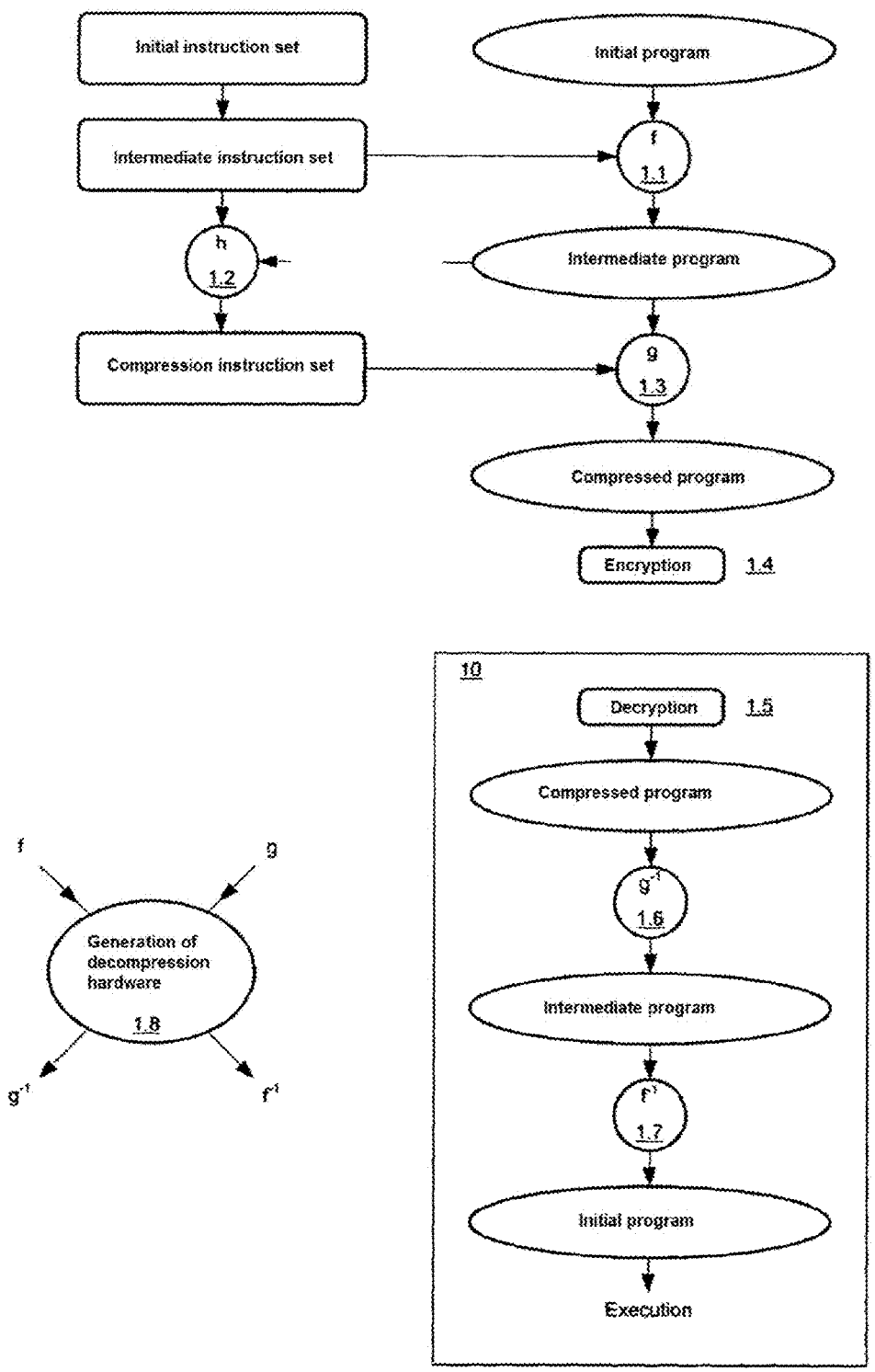
FIG. 1 shows the different steps of methods for compression/decompression and synthesis of decompression hardware.

The compression is performed with or without a loss of data. The present invention describes a compression without loss of data. A person skilled in the art may apply the present invention to a compression with a loss of data.

The invention applies to integrated circuit devices and, in particular, but not exclusively, to embedded devices.

The ICs of embedded devices covered by the present invention have reduced hardware and software resources by comparison with the hardware and software resources of computers and, in particular, personal computers. As examples, this invention applies primarily to ICs of integrated circuit objects, in particular modules for UICC cards (commonly called SIM cards) or any other secure communicating object such as a passport, a transport card, a health card, a driver's license, etc. Other embedded devices may benefit from this invention, in particular mobile telephone platforms, media players or readers. Similarly, machine applications with machines in which a security module is embedded in at least one of the machines such as electric meters, motor vehicles or any object requiring such a security module may benefit from this invention.

The instruction set of a microprocessor is the set of operations executable by the microprocessor.

The instruction set of an interpreter is the set of operations interpretable by the interpreter.

In an example according to the invention, the instruction set is a reduced instruction set. The microprocessor is then an RISC microprocessor. In a more specific example, the instruction set is the instruction set of the 32-bit SPARC-V8™ microprocessor.

The instructions of an instruction set are constituted by an opcode, with which operands are associated.

The present invention defines three instruction sets:
initial,
intermediate, and
compression.

An initial instruction is an instruction in the format of the initial instruction set, an intermediate instruction is an instruction in the format of the intermediate instruction set and a compressed instruction is an instruction in the format of the compression instruction set.

An initial program is an instruction set in the format of the initial instruction set. An intermediate program and a compressed program are defined in the same way.

Compression is the set of steps leading from the initial program to the compressed program.

Decompression is the set of steps leading from the compressed program to the initial program.

A macro is a set of intermediate instructions capable of being compressed. Macros are packets of bits m.

In general, the compression method according to the invention consists of replacing the macros with compressed instructions with a lower number of bits c.

By compressing n occurrences, a memory space of $$n \times (m-c) \text{ bits}$$

is economized. A plurality of compressed instructions are identified, for each of them, n, m and c may be different.

The invention will be easier to understand in view of the following detailed description, with reference to the appended figures, wherein:

FIG. 1 shows the preferred embodiment of the invention.

Steps 1.1, 1.2 and 1.3 relate to compression. These steps as well as step 1.4 are executed outside the IC 10 with powerful computation means. The step of synthesis of the decompression hardware is also performed outside the IC 10. Steps 1.5, 1.6 and 1.7 are performed by the IC. The initial set of instructions is reformatted to generate the intermediate instruction set.

In step 1.1, the initial program is modified by function f and becomes the intermediate program.

The intermediate program is analyzed. This learning makes it possible to index the notable structures, called repetition patterns, present in the intermediate programs. The repetition patterns have the dimension of the intermediate instructions capable of being replaced. These patterns are comprised of fixed characters (bits), 0 or 1, and generic characters (bits), Z, determined subsequently.

In step 1.2, function h generates the compression instruction set resulting from the patterns. Each instruction of the compression instruction set is comprised of an identifier for pointing to the patterns and a field of bits that determine the value of the generic characters, if they exist.

In step 1.3, function g replaces the intermediate instructions with compressed instructions; also, this step takes into account address changes. The program is made of compressed instructions.

In step 1.4, the program may be made secret before being stored in a memory of the device 10. The compressed program is encrypted with a secret key using a standard or secret algorithm. The compressed and encrypted program is protected by the key present in the device, possibly embedded, which enables its decryption. These secrets protect the device in particular:

during programming of the memory. The invention makes it possible to delocalize the programming of the memory, in particular the flash memory, without sharing the algorithms and other confidential functions contained in the program with the manufacturers. The secret decryption key can be put into place in a subsequent step of personalizing the secure communicating object; and when the circuit is in the field. The program stored in the memories is secret and therefore protected from physical attacks.

In step 1.8, the decompression hardware, functions $f^{-1}$ and $g^{-1}$, is synthesized for integration in the IC 10. This hardware can be reconfigured subsequently on the IC so as to optimize the compression when the same IC is used for a plurality of applications in which only the program differs. Indeed, to optimize the logistics, users want to supply a single platform, i.e. a single IC, for a plurality of applications.

In step 1.5, the secret program is decrypted. Said decryption is advantageously performed on the fly. At the end of this step, the program is decrypted and again compressed.

In step 1.6, the hardware reformats, by function $g^{-1}$, the compressed instructions and delivers the intermediate instructions.

In step 1.7, another hardware item reformats, by function $f^{-1}$, the intermediate instructions and delivers the initial instructions.

Steps 1.6 and 1.7 are performed on the fly, and thus do not detrimentally affect the execution time.

The program thus obtained is made of initial instructions.

In a last step according to the invention, the initial instructions are then executed and/or interpreted.

Figure 2:
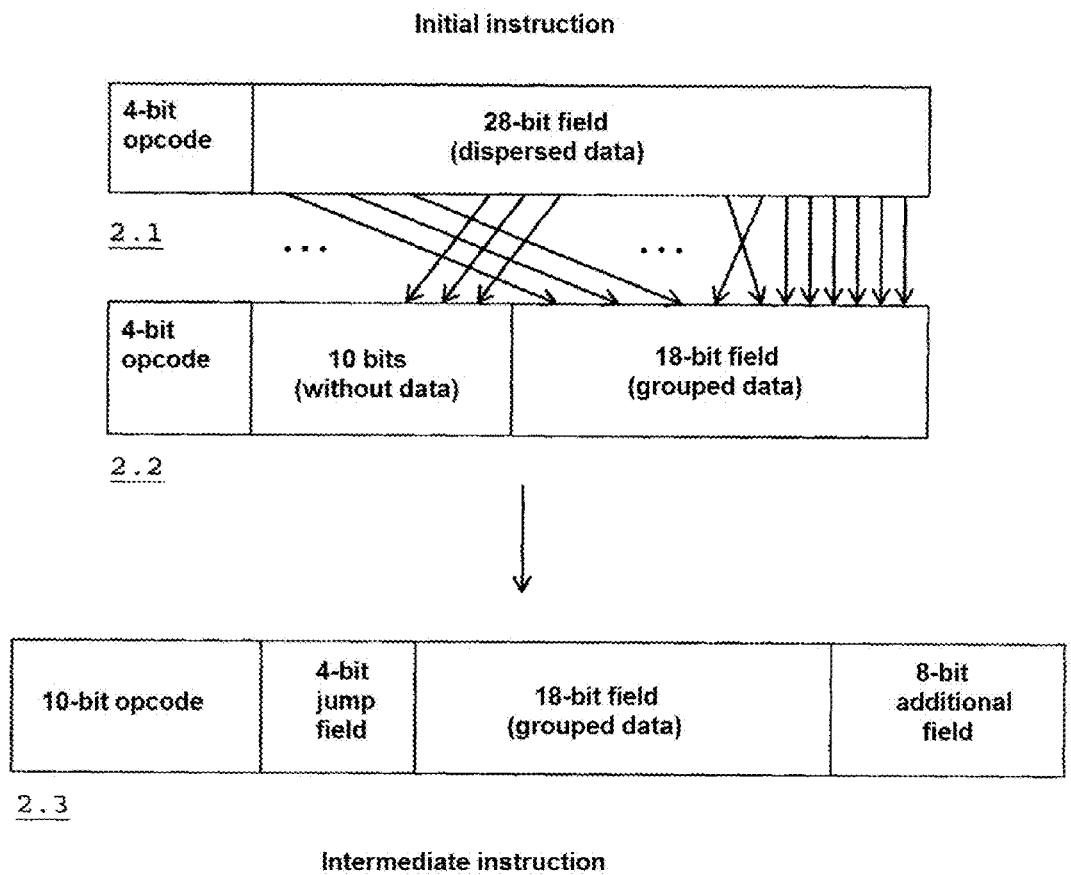
FIG. 2 shows the step of reformatting the initial instructions to obtain intermediate instructions.

FIG. 2 shows in detail the reformatting step 1.1 of FIG. 1 of the initial instructions for obtaining intermediate instructions according to the invention.

Step 2.1 shows an example of an initial instruction. This instruction has 32 bits and includes an opcode of 4 bits followed by an instruction code of 28 bits.

In step 2.2 of the reformatting, the useful data contained in the instruction field is grouped on the terminal bits of the field. Thus, the first bits of the instruction field, located after the opcode, are freed. The initial instruction is transformed into an instruction including, at the top, a 4-bit opcode, followed by a 10-bit freed field without data, then an 18-bit grouped data field. The instruction transformed after step 2.2 therefore has exactly the same number of bits as the instruction of the initial instruction set.

In step 2.3, the instruction resulting from the previous step is transformed into an instruction of a potentially different size. Said transformation reorganizes the fields of bits contained in the instruction of step 2.2 and offers the possibility of adding additional data.

The field intended for the definition of opcodes is extended and, consequently, increases the number of elements of the instruction set. A jump field is also defined so as to contain data intended to perform jumps at the level of labels aligned on octets in the compressed program. Additional fields may be added to include additional data there.

The instruction then obtained as a result of step 2.3 is an instruction reformatted in the format of the intermediate instruction set.

The reformatted instruction includes, at the top, a 10-bit opcode field, then a 4-bit jump field, an 18-bit grouped data field, and an additional 8-bit field. As a result of the reformatting, the size of the instructions of the intermediate instruction set may be greater than that of the instructions of the initial instruction set. This step prepares for a more effective compression.

The intermediate instructions are not necessarily aligned on octets and may have different lengths.

FIG. 3 shows, as an example, a reorganization of bit fields in order to increase the similarity in the program and, consequently, increase the efficacy of the subsequent compression. This involves the following complementary operations:

the relative addressing is advantageously transformed into absolute addressing;

specific fields are advantageously classified; and certain fields are advantageously inverted.

Step 3.1 presents an example of a program encoded in an initial instruction set. The left-hand column indicates the addresses, the next column indicates the instructions and the right-hand column indicates the resulting binary. The first field of the binary indicates the opcode. In the case of a branch "B", the second field encodes the relative address, while for a "MOV", the second field encodes the immediate value and the third field encodes the registry. The branch instructions "B" are relative, and the binary is different. The absolute addressing is encoded in the same way regardless of the position of the instruction with the address in the program, while the relative addressing is dependent on the position of said instruction.

Step 3.2 shows the binary after replacement of the relative addressing with the absolute addressing.

In addition, step 3.1 shows specific bit fields of which the contents have a very low variability. For example, for 75% of the fields of the 3-bit registry of certain programs, only 2 of the $2^3$ possibilities are used. In these specific fields, it is therefore possible to determine the value of most of the bits with a certain probability. Therefore, it is possible to deduce the contents of the field on the basis only of the knowledge of the value of the remaining bits. These fields are therefore classified and replaced by their position in the classification.

Step 3.3 shows the binary transformed after re-encoding of the field of the registry.

In step 3.4, the binary of the example is transformed according to the following method. The two instructions "MOV-1, ..." are modified so as to create more similarity in the program. A signed 5-bit field encoding the digit +1 or the digit −1 includes many different bits, while, if the bits representing −1 are inverted, the fields become very similar. It is therefore of great interest to invert these fields. It is by creating a new opcode "11" that the inversion of the field is indicated.

FIG. 4 shows two additional types of data capable of being added to the initial instructions of step 4.1. This data is inserted into the intermediate instruction during the step of reformatting the initial program, or interleaved between the compression instructions before loading the program in the memory.

In step 4.2, the additional data is an error detection and/or correction field or an ECC field. Said field is, for example, the result of a CRC computation. This field is particularly useful for correcting memory defects. It increases the production efficiency of the devices, the reliability of said devices and minimizes the costs of said devices.

The ECC field is also particularly useful for protecting the program from malevolent attacks, such as attacks involving the injection of errors, which are capable of modifying the program and causing trapping.

In step 4.3, the additional data is a signature field useful for producing a counter-measure to trapping attacks. Two types of signature field are added to the compressed code:

a first field verifies the successful execution of instructions executed without jumps. A field is placed after each jump instruction and before each label. Said field signs all of the instructions executed between the previous label or jump instruction and the present label or jump instruction, a second field verifies the jumps. A signature of the address of each label is inserted in the address of the label.

In general, said field signs the current and/or adjacent instructions and the current addresses and/or the addresses accessed in the event of a jump. The invention enables one hundred percent coverage of the verification of the chaining of instructions without using modifications of compilation tools or substantial blocks of the device such as the microprocessor.

In the compression steps, the signature field is computed. Said field is an additional data item added to the intermediate instructions, or then interleaved between the compression instructions.

In the decompression step, the signature field is computed on the target device, advantageously on the fly, according to the instructions and addresses entering the decompression stage. A comparison between the signature field generated by computation and that present in the instruction of the intermediate instruction set makes it possible to verify the non-trapping and the integrity of the instructions.

The addition of redundancies in the program in order to correct memory defects or secure target devise from malevolent attacks is known in the prior art. The redundancies increase the size of a specific memory. For ICs of embedded devices of which the program may be enriched by redundancies during the compression steps, the size of the memory occupied by the program, with the redundancies, compressed, is lower for the same efficacy of memory defect correction and security against the identical malevolent attacks.

Figure 5:
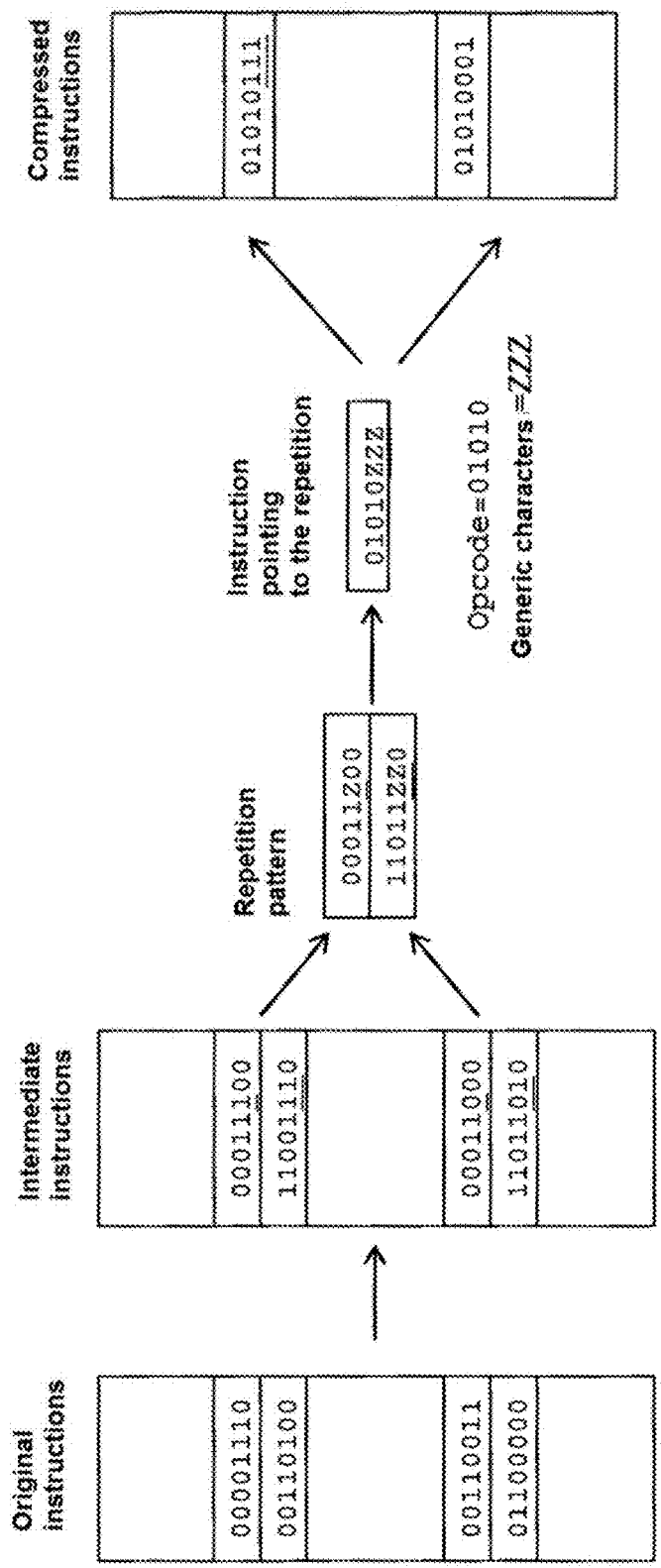
FIG. 5 shows the step of creating the compression instruction set.

FIG. 5 shows in detail steps 1.1, 1.2 and 1.3 of FIG. 1, in which the repetition pattern, the creation of instructions of the compression instruction set and the replacement of intermediate instructions with compressed instructions are determined.

The repetition patterns have a size of m bits equal to the length of the intermediate instructions capable of being replaced, also called "macros". They comprise m−q bits fixed at 0 or at 1, and q bits including generic characters noted as Z. A pair formed by a repetition pattern and an instruction of the compression instruction set is defined. The opcodes of p bits identify the repetition pattern and the instruction field fixes the q values of the generic characters.

The example below shows how the repetition patterns are determined.

Let us assume a series of 40 bits of the program represented in the following 5 lines of table 1:

TABLE 1

| Line | Bit1 | Bit2 | Bit3 | Bit4 | Bit5 | Bit6 | Bit7 | Bit8 |
|---|---|---|---|---|---|---|---|---|
| 1 | 0 | 0 | 0 | 0 | 0 | 0 | 0 | 1 |
| 2 | 0 | 1 | 0 | 0 | 0 | 0 | 0 | 1 |
| 3 | 1 | 0 | 1 | 0 | 0 | 0 | 0 | 1 |
| 4 | 0 | 1 | 1 | 0 | 0 | 0 | 0 | 1 |
| 5 | 0 | 0 | 0 | 0 | 0 | 0 | 0 | 1 |

It is possible to define the repetition pattern "Pattern I" having 8 fixed bits and 0 generic characters. An instruction of the compression instruction set is defined which includes a 3-bit opcode and a field of length 0. This instruction makes it possible to replace lines 1 and 5:

| | | | Pattern I | | | | |
|---|---|---|---|---|---|---|---|
| 0 | 0 | 0 | 0 | 0 | 0 | 0 | 1 |

It is also possible to define the following repetition pattern "Pattern II" having 6 fixed bits and 2 generic characters. An instruction of the compression instruction set is defined which includes a 4-bit opcode and a field of length 2. This instruction makes it possible to replace lines 1, 2, 4 and 5:

| | | | Pattern II | | | | |
|---|---|---|---|---|---|---|---|
| 0 | Z | Z | 0 | 0 | 0 | 0 | 1 |

It is also possible to define the following repetition pattern "Pattern III" that contains 0 fixed bits and 8 generic characters. An instruction of the compression instruction set is defined which includes a 3-bit opcode and a field of length 8. This instruction makes it possible to replace lines.

| Pattern III | | | | | | | |
|---|---|---|---|---|---|---|---|
| Z | Z | Z | Z | Z | Z | Z | Z |

By using the instructions of the compression instruction set associated with Patterns I, II and III, the 40 program bits of Table 1 can be compressed. One of the possible compressed programs is represented in the 5 lines numbered 1 to 5 of Table 2 below:

TABLE 2

| Line | Bit1 | Bit2 | Bit3 | Bit4 | Bit5 | Bit6 | Bit7 | Bit8 |
|---|---|---|---|---|---|---|---|---|
| 1 | 1 | 1 | 1 | | | | | |
| 2 | 1 | 1 | 0 | 1 | 1 | 0 | | |
| 3 | 0 | 0 | 0 | 1 | 0 | 1 | 0 | 0 |
| 4 | 1 | 1 | 0 | 1 | 1 | 1 | | |
| 5 | 1 | 1 | 1 | | | | | |

As is shown in Table 2, the instruction associated with Pattern I is applied twice, for lines 1 and 5, the instruction associated with Pattern II, while applicable four times in lines 1, 2, 4 and 5, is applied only twice, in lines 2 and 4. It will be noted that line 3 is reformatted using Pattern III.

The compressed program is therefore 29 bits, while the initial program includes 40 bits.

The example shows that the repetition patterns have different efficacies. Determining effective repetition patterns makes it possible to compress more by means of a reduced list of repetition patterns.

An analysis of the instruction set and the compilation result makes it possible to establish a first-order list of repetition patterns. Compressing a program with this list leads to a compression ratio that is entirely beneficial, but nevertheless not optimal.

The method according to this invention presents an algorithm capable of determining an optimal set of repetition patterns. Said algorithm takes, as its entry point, the instructions produced by the compilation of an application written in a high-level language, in C or JAVA™ language, for example. Said algorithm is a learning algorithm. The set of repetition patterns thus determined is strongly dependent on the instruction set and the compiler. However, the choice of the starting application has little influence on said set of repetition patterns if it does reflect the cases of use of the high-level language. Said set may reserve several configurable repetition patterns, i.e. the value of said repetition patterns is written in the ROM memory. Said repetition patterns cover the very specific cases of certain applications. The resulting set of repetition patterns makes it possible just as effectively to compress the application chosen as the starting point of the algorithm as the other applications, without changing hardware.

To obtain an optimal list of repetition patterns, said repetition patterns are determined by using a repetition pattern definition algorithm. An initial instruction is compressed adequately if:
the number c of bits of said compressed instruction is small,
the number m of bits of the repetition pattern is large, and
the number n of occurrences of said repetition pattern in the program to be compressed is large.

In this case, $n\times(m-c)$ bits are capable of being economized during the compression by defining only one instruction in the compression instruction set. Of course, the number q of bits of the new opcode defined for this new instruction should also be as short as possible, while being sufficient for additional opcodes, useful for the compression, to be capable of being assigned.

For the implementation of the method according to the invention, the macros are advantageously grouped according to:
the types of opcode of the instructions contained in said macros, and the need to modify the links of the program of macros after the compression. The determination of repetition patterns is performed for each group of macros as described in detail below.

The parameters m, q and c must first be supplied to the repetition pattern determination algorithm. The following actions are executed:
1) values are assigned to parameters m, q and c;
2) optional step: the probability of the value by bit is computed for all of the macros in a group of macros;
3) optional step: fixing to 0 or 1 the bit of which the probability is closest to 0 or 1, respectively;
4) removing from the macro group all macros not satisfying the preceding decision;
5) returning to step 2 unless the necessary number of fixed positions has been reached;

The remaining positions are variable and constitute the repetition pattern. Ideally, the bits of said repetition pattern have a probability of being at 0 and 1 equal to 0.5.
6) if n is the number of macros associated with the repetition pattern, the number $n\times(m-c)$ of bits may be economized. The repetition pattern is then added to a list of repetition patterns.

It should be noted that the number of repetition patterns increases by applying the algorithm multiple times with different parameters. Advantageously, in consideration of the fact that the number of instructions is limited, the least effective repetition patterns are removed as the list is established. Only the final list, including the most effective repetition patterns, constitutes the compression instruction set.

It should also be noted that, in consideration of the fact that the macros, in a group of macros, are, in practice, very different from one another, the determination of the repetition patterns is advantageously guided. To this end, certain bits of repetition patterns are predefined at 0 or 1 and the instructions, which do not correspond to the definition patterns of which certain bits have been predefined, are removed from the group. Therefore, the sub-group thus obtained contains only instructions of which the number of bits that differ is lower.

Figure 6:
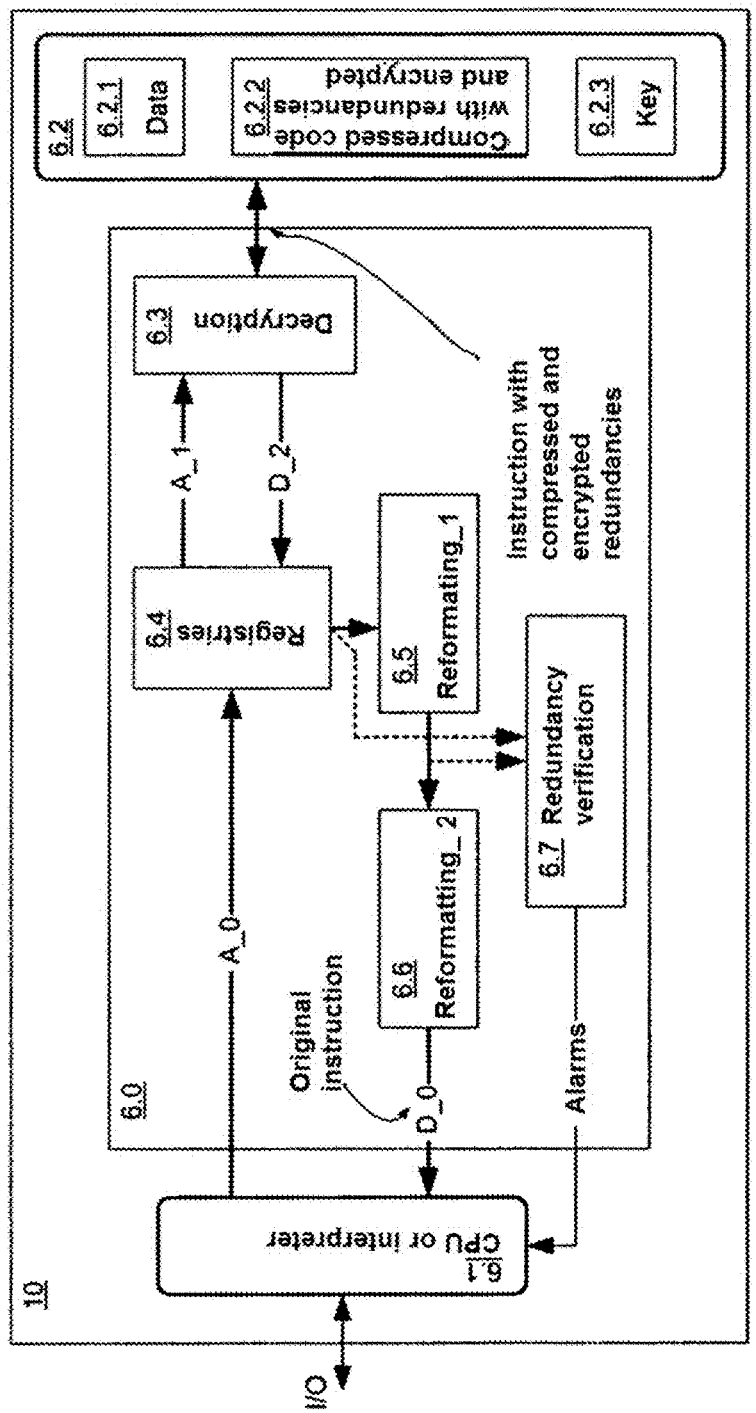
FIG. 6 shows the decompression steps, as well as the hardware elements involved in these steps.

FIG. 6 shows the decompression device 6.0 according to the invention used in an IC 10.

The I/O makes it possible to communicate with the external world via communication channels defined in the standards, as examples, and in a non-limiting manner, Single Wire Protocol [SWP], USB, NFC 14443 or ISO/IEC 7816-3 . . . .

The decompression device is located between the CPU 6.1 and the memory 6.2 and makes it possible to decompress, on the fly, the compressed instructions stored in the memory 6.2. The decompression operation does not have an impact on the cycle time and its hardware impact is minor, i.e. the number of hardware gates necessary for the decompression is less than 4000 (4 kgates).

The memory 6.2 contains the data of the program 6.2.2, the data 6.2.1 and the decryption key 6.2.3. If the key is used, it is programmed in the secure communicating object preferably by the customization agency immediately before its delivery to the end client.

The block 6.3 decrypts the program if the encryption function is activated.

When the CPU microprocessor 6.1 requires the reading of an instruction in the memory at a given address (Fetch), the required address is presented to the registries 6.4. Said registries buffer the data coming from the memory 6.2.2, if the octets corresponding to the address requested by the CPU is present in the registries, the compressed instructions are transferred to the reformatting block 6.5. Otherwise, the transfer is preceded by one or more memory accesses. The compressed instruction is then reformatted by 6.5 and by 6.6, successively, by the hardware, in order to obtain, in a first stage, intermediate instructions, then initial instructions. These initial instructions are then supplied to the microprocessor 6.1.

Additional data inserted in the compression steps is extracted either between steps 6.5 and 6.6 if it is integrated in the intermediate instructions, or at the output of the registries 6.4 if it is interleaved with the compressed instructions. For example, block 6.7 computes the signature field, according to instructions and addresses entering the decompression stage. A comparison between the signature field generated by computation and that present in the intermediate instruction verifies the non-trapping and the integrity of the instructions and generates at least one alarm in the event that an error is detected.

It is useful to define a functionality that deactivates and activates the decompression, which enables the microprocessor to execute the program in the format of either the initial or the compression instruction set.

The compression is, for example, deactivated to insert a patch comprised of initial instructions, or to execute only initial instructions. The activation or the deactivation can be performed, for example, by inserting, in the program of the memory, an NOP instruction with a field that indicates which configuration to adopt. The information contained in said instruction configures the decompression and a normal NOP instruction is transmitted to the microprocessor. FIG. 7 shows the performance of the method according to the invention.

The method was applied to the Dhrystone 2.1™, AES of MiBench™, Paranoia™ and Stanford compiled on a SPARC-VB™ instruction set.

FIG. 7.1 shows the sizes in kilooctets (kBytes) of each of the programs compressed according to the invention and/or non-compressed.

FIG. 7.2 shows, for each program, the percentage of reduction of the size of the program.

In addition to minimizing the memory size, the compression and decompression method according to the invention minimizes the energy consumption of the IC and increases the program execution speed. Indeed, the decompression device:

anticipates the memory access of the microprocessor, thereby accelerating the execution of the program, accesses words in the memories that potentially contain a plurality of initial instructions. The number of memory accesses is reduced, thereby minimizing the energy consumption. For a smart card, for example, the consumption of the memory of the program is the main source of consumption. A 50% compression of the program reduces its consumption by 20%.

releases the bandwidth on the buses of the microprocessor. The data is more quickly accessible, thereby reducing the execution time of the program.

The invention claimed is:

1. A method for compressing and decompressing an initial program executable by a microprocessor or interpretable by an interpreter of an integrated circuit device, comprising the following steps of:
 a) providing the initial program comprising a set of initial instructions having program links, said initial instructions having an opcode and an instruction field;
 b) reformatting the initial instructions of said initial program to obtain intermediate instructions of an intermediate program by function f;
 c) determining repetition patterns in said intermediate program having m bits and comprising m−q bits fixed at 0 or 1 and q generic characters, and defining, for each repetition pattern of a list of repetition patterns, a pair formed from said repetition pattern and an instruction compressed by function h;
 d) replacing the intermediate instructions with compressed instructions and modifying the program links to obtain a program compressed by function g;
 e) replacing the compressed instructions with the intermediate instructions by function $g^{-1}$ to obtain the intermediate program; and
 f) reformatting the intermediate instructions by function $f^{-1}$ to obtain the initial program.

2. The method according to claim 1, according to which, in step b), to increase similarity in the intermediate program, relative addressing is transformed into absolute addressing and/or specific fields are classified and/or certain fields are inverted.

3. The method according to claim 1, according to which the repetition patterns, in step c), are determined by applying the following method for a group of macros:
 step 1: assigning values to parameters m, q and c, wherein c is a number of bits of the compressed instruction;
 step 2: for all of the macros in the group of macros, calculating a probability of a value by bit;
 step 3: fixing, at 0 or 1, bits of which a probability is closest to 0 or 1, respectively;
 step 4: extracting, from the group of macros, all of the macros not satisfying a previous decision;
 step 5: returning to step 2 unless a necessary number of fixed positions has been reached;
 step 6: if n is the number of macros associated with the repetition pattern, the number n×(m−c) of bits may be economized, and the repetition pattern is added to the list of repetition patterns.

4. The method according to claim 1, according to which the program compressed in step d) is encrypted then decrypted before step e).

5. The method according to claim 4, according to which the encrypted program is decrypted on the fly.

6. The method according to claim 1, according to which the compressed program is decompressed on the fly and the initial instructions are executed.

7. The method according to claim 1, according to which the reformatting of the instructions defines new fields intended for jump data and/or new opcodes and/or redundancy to ensure the integrity of the instructions and/or of the data intended for protection against trapping of the program.

8. The method according to claim 7, according to which a new field contains the signature of the instructions and/or the addresses of the instructions and/or the address accessed in the event of a jump.

9. The method according to claim 1, according to which additional data is inserted between two compressed instructions.

10. An integrated circuit device capable of executing a program executable by a microprocessor of said device or of interpreting such a program interpretable by an interpreter of said device, including a program compressed according to claim 1.

11. The device according to claim 10, according to which the decompression algorithm, functions $g^{-1}$ and/or $f^{-1}$, is synthetized in hardware on one of integrated circuits.

12. The device according to claim 10, connected to the exterior world by at least one of the following communication channels: single wire protocol NFC (Near Field Communication) (International Organization for Standardization norm ISO14443), USB (Universal Serial Bus), or International Organization for Standardization and International Electrotechnical commission norm ISO/IEC7816-3 and controlled by a microprocessor that executes, on the fly, the initial program instructions stored and compressed in the memory of one of the integrated circuits.

13. The device according to claim 10, according to which the set of compressed instructions of said program is stored in the non-volatile memory of one of the integrated circuits.

14. The device according to claim 10, according to which the microprocessor is an RISC (Reduced Instruction Set Computing) microprocessor.

15. The method according to claim 1, according to which the repetition patterns, in step c), are determined by applying the following method for a group of macros:
   step 1: assigning values to parameters m, q and c, wherein c is a number of bits of the compressed instruction;
   step 2: evaluating a number of macros that fulfill criteria for complying with the repetition pattern;
   step 3: if n is the number of macros associated with the repetition pattern, the number n×(m−c) of bits may be economized, and the repetition pattern is added to the list of repetition patterns.

16. A method for compressing and decompressing an initial program executable by a microprocessor or interpretable by an interpreter of an integrated circuit device, comprising the following steps of:
   a) reformatting initial instructions of said initial program to obtain intermediate instructions of an intermediate program by function f;
   b) determining repetition patterns in said intermediate program, and defining, for each repetition pattern of a list of repetition patterns, a pair formed from said repetition pattern and an instruction compressed by function h;
   c) replacing the intermediate instructions with compressed instructions and modifying the program links to obtain a program compressed by function g;
   d) replacing the compressed instructions with the intermediate instructions by function $g^{-1}$ to obtain the intermediate program; and
   e) reformatting the intermediate instructions by function $f^{-1}$ to obtain the initial program;
wherein the repetition patterns, in step b), are determined by applying the following method for a group of macros:
   step 1: assigning values to parameters m, q and c, wherein m is a number of bits of the repetition pattern, q is a number of generic characters for the repetition pattern, and c is a number of bits of the compressed instruction;
   step 2: for all of the macros in the group of macros, calculating a probability of a value by bit;
   step 3: fixing, at 0 or 1, bits of which a probability is closest to 0 or 1, respectively;
   step 4: extracting, from the group of macros, all of the macros not satisfying a previous decision;
   step 5: returning to step 2 unless a necessary number of fixed positions has been reached;
   step 6: if n is the number of macros associated with the repetition pattern, the number n×(m−c) of bits may be economized, and the repetition pattern is added to the list of repetition patterns.

17. The method according to claim 16, according to which, in step a), to increase similarity in the intermediate program, relative addressing is transformed into absolute addressing and/or specific fields are classified and/or certain fields are inverted.

18. The method according to claim 16, according to which the program compressed in step c) is encrypted then decrypted before step d).

19. The method according to claim 18, according to which the encrypted program is decrypted on the fly.

20. The method according to claim 16, according to which the compressed program is decompressed on the fly and the initial instructions are executed.

\* \* \* \* \*